United States Patent [19]

Halasa et al.

[11] 3,882,094
[45] May 6, 1975

[54] HYDROGENATION OF RUBBERS

[75] Inventors: Adel Farhan Halasa, Bath; Richard Gutierrez, Akron, both of Ohio

[73] Assignee: The Firestone Tire & Rubber Company, Akron, Ohio

[22] Filed: Oct. 21, 1973

[21] Appl. No.: 410,870

[52] U.S. Cl. ............ 260/85.1; 260/80.78; 260/82.1; 260/83.3; 260/94.7 H; 260/96 HY; 260/768; 252/429
[51] Int. Cl. ............................................. C08d 5/02
[58] Field of Search............. 260/85.1, 82.1, 94.7 H, 260/83.3, 80.78

[56] References Cited
UNITED STATES PATENTS
3,766,300   10/1973   De La Mare ...................... 260/879

*Primary Examiner*—William F. Hamrock

[57] ABSTRACT

The invention relates to the hydrogenation of a rubber in the presence of a catalyst which is the reaction product of $Co(Py)_2Cl_2$ (a complex of pyridine and cobaltous chloride) and trialkyl aluminum or dialkyl aluminum hydride.

4 Claims, No Drawings

HYDROGENATION OF RUBBERS

The invention relates to the catalytic hydrogenation of unsaturated rubber. It includes the new catalyst which is employed.

The rubber is a diene rubber. It may be a natural rubber or a synthetic rubber as, for instance, polybutadiene, polypenteneamer of polyisoprene; an alternating copolymer of butadiene-ethylene, butadiene-propylene or butadiene-acrylonitrile; a copolymer of butadiene and isoprene, ethylenepropylene terpolymer (EPT), or a copolymer of butadiene or isoprene with (1) styrene or an alkyl derivative of styrene (e.g. alphamethyl styrene, etc.) or (2) acrylonitrile. The rubber may comprise an alkali metal terminal group. The hydrogenation of such rubbers is known in the art.

The hydrogenated rubbers are useful as thermoplastic elastomers. They are stable at high temperatures and are resistant to oxidative degradation. They are useful for the manufacture of tires, shoe soles, hoses, luggage, upholstery in automobiles, etc., and are useful as adhesives.

Kroll U.S. Pat. No. 3,412,174 uses the reaction product of a transition-metal salt (e.g., a cobalt salt of a carboxylic acid), an organometallic (e.g., triisobutyl aluminum) and a Lewis base, as a catalyst for hydrogenation. The catalyst is ineffective at high temperatures and unstable over a long period of time. The patent does not suggest the use of pyridine in producing the reaction product, nor does it suggest the use of the reactants in the preferred ratio disclosed herein.

The catalyst is the reaction product of $Co(Py)_2Cl_2$ (a complex of pyridine and cobaltous chloride) and trialkyl aluminum or dialkyl aluminum hydride. The alkyl groups may contain one to eight or more carbon atoms. Trimethyl or triethyl or triisobutyl aluminum or diisobutyl aluminum hydride is preferred. During the reaction the cobalt is reduced from $Co^{II}$ to $Co^{I}$, and $Co^{I}(Py)Al$ is formed in which the molar ratio of Co/Py/Al is 1/2/3. The presence of the pyridine in the compound stabilizes it and inhibits poisoning of the catalyst. It also makes the hydrogenating complex soluble in the reaction medium. The $AlR_3$ is a reducing agent in which the alkyl group from the Al may be transferred to the cobalt and consequently may form unstable $CoR_2$. The presence of pyridine solublizes the $Co^{I}H$ and prevents it from aggregating into an insoluble compound.

The molar ratio of the reducing agent to the transition metal complex to the pyridine is very critical. At Al/Co ratio of 6 or more, a disadvantageous increase in the molecular weight of the polymer is produced. Sometimes the reaction leads to gelation. The preferred ratio of Al/Co is 3/1.

Transition metal to pyridine ratio is very critical. The best ratio is 2 pyridine/1 cobalt salt, such as the chloride, bromide or iodide. The $CoCl_2 \cdot 2$ pyridine is well known in the literature and fully characterized. An increase in the amount of pyridine over the recommended amount poisons the catalyst and a decrease in the amount of pyridine to below that recommended shows no catalyst activity.

The mode of preparation of the catalyst is as follows: $CoCl_2$ is suspended in 200 ml. of toluene followed by the addition of 2 equivalents of pyridine. The complex $CoCl_2 \cdot 2Py$ is formed immediately as indicated by the deep blue solution which develops instantly. This complex which is soluble in toluene is then reduced with the appropriate amount of aluminum trialkyl or dialkyl aluminum hydride in which the alkyl group contains 1 to 8 carbon atoms. The preferred ratio of Al/Co is 3. So the catalyst compound is formed with the ratio of Co/Py/Al is 1/2/3. It has the formula $CoPy_2(AlR_3$ or $HAlR_2)_3$.

The hydrogenation reaction may be formed in a stainless steel autoclave equipped with a pressure gauge and appropriate plumbing for introducing hydrogen into the reactor. The rubber used in the examples is a copolymer of butadiene and styrene, 75/25, in hexane solvent at a 10 per cent concentration. The temperature of the autoclave is adjusted to 112°F. and then the catalyst is added to the solution with continuous stirring. The hydrogenation reaction proceeds immediately, and within 1 to 2 hours the hydrogenation is completed. The refractive index of the rubber is used to measure the uptake of hydrogen. The polymer is isolated and characterized by NMR which shows the absence of olefinic peaks between 275 and 325 Hz.

The hydrogenation conditions can be varied depending upon the particular polymer to be hydrogenated. Normally, hydrogenation reactions can be carried out at temperatures ranging from −20° C. to 500° C. However, the preferred conditions are −20° C to 150° C. with pressures ranging from about 1 atmosphere to 15,000 psig., and the preferred range is 1 atmosphere to 3000 psig., and particularly from 25 to 1000 psig. For rubbers that contain terminal or internal olefinic units, for example, polybutadiene, polyisoprene, butadiene-isoprene copolymer, butadiene-propylene copolymer and isoprene-propylene copolymer, etc., the preferred hydrogenation temperature ranges from 0° C. to 80° C. at pressures of 25 to 500 psig. However, for rubbers that contain some aromatic groups, such as butadiene-styrene, or nitrile such as butadiene-acrylonitrile, the preferred hydrogenation conditions are temperatures between 0° C. and 100° C. and pressures of 500 to 15,000 psig.

The length of the hydrogenation time is not too critical and may be from 1 minute to 20 hours, depending upon the process employed and the rubber used.

The catalyst system described herein can be used for selective hydrogenation of various groups. It may be used for hydrogenation of terminal olefins in preference to internal olefins, such as 1,2-polybutadiene, etc.

The extent of the hydrogenation can be controlled by the amount of hydrogen introduced, and the rate at which the hydrogenation takes place is controlled by the temperature and the pressure.

PREPARATION OF CATALYST

The catalyst was prepared from 9.5 millimoles of cobaltous chloride in toluene (anhydrous)
19.0 millimoles of pyridine (anhydrous)
28.5 millimoles of tri-isobutyl aluminum The cobaltous chloride was added to 200 mM. of anhydrous toluene in a 28 oz. bottle. This was shaken well. Then the pyridine was added. A deep blue color, known as characteristic of cobaltous chloride.2 pyridine developed immediately. The i-$Bu_3Al$ was added to this solution at 0° − 15° C.

HYDROGENATION OF BUTADIENE-STYRENE 200 gr. butadiene-styrene copolymer (75/25) was hydrogenated. A solution of 10 percent of the copolymer was prepared in 90 percent hexane. The solution was purged several times with hydrogen and with the temperature adjusted to 212° F., 9.5 mM. of hydrogenation. Catalyst, prepared as above, was added and the reaction mixture was subjected to hydrogen pressure of 200 psig. and agitated for 4 hours under constant 200 psig. hydrogen pressure. The reaction mixture was cooled to about room temperature and the polymer was coagulated by stirring it into iso-propanol.

The polymer had a reactive index of 1.5102, indicating complete hydrogenation of the polymer had been accomplished. The NMR analysis of the polymer showed characteristic absorption peaks at 100 Hz of aliphatic methylene groups. The spectrum was void of any olefinic groups at 275–325 Hz.

We claim:

1. The process of hydrogenating a rubber containing olefinic unsaturation which comprises treating the rubber in solution in an inert solvent containing as a hydrogenation catalyst $Co(Pyridine)_2 (AlR_3$ or $H. AlR_2)_3$ in which each R is an alkyl group containing 1 to 8 carbon atoms, at a temperature of $-20°$ C. to $500°$ C. and a pressure of 1 atmosphere to 15,000 psig.

2. The process of claim 1 in which the rubber contains only aliphatic groups, the temperature is $0°$ C. to $80°$ C. and the pressure is 25 to 500 psig.

3. The process of claim 1 in which the rubber contains aromatic groups, the temperature is $0°$ C. to $100°$ C. and the pressure is 500 to 15,000 psig.

4. The process of claim 1 in which the rubber is a polymer with an alkali metal terminal group.

* * * * *